(12) United States Patent
Horsch (10) Patent No.: US 10,130,023 B2
(45) Date of Patent: Nov. 20, 2018

(54) SUSPENSION DEVICE OF AN AGRICULTURAL MACHINE

(71) Applicant: Horsch Maschinen GmbH, Schwandorf (DE)

(72) Inventor: Philipp Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 64 days.

(21) Appl. No.: 15/327,961

(22) PCT Filed: Jul. 30, 2015

(86) PCT No.: PCT/EP2015/067601
§ 371 (c)(1),
(2) Date: Jan. 20, 2017

(87) PCT Pub. No.: WO2016/020273
PCT Pub. Date: Feb. 11, 2016

(65) Prior Publication Data
US 2017/0208732 A1     Jul. 27, 2017

(30) Foreign Application Priority Data

Aug. 5, 2014   (DE) .................. 10 2014 111 136

(51) Int. Cl.
  *A01B 61/04*      (2006.01)
  *A01C 5/06*       (2006.01)
  *A01C 7/20*       (2006.01)

(52) U.S. Cl.
  CPC ............ *A01B 61/046* (2013.01); *A01C 5/064* (2013.01); *A01C 7/201* (2013.01); *A01C 7/206* (2013.01)

(58) Field of Classification Search
  CPC ..... A01B 61/046; A01B 61/044; A01B 61/04; A01B 61/00; A01C 5/064; A01C 5/062;
  (Continued)

(56) References Cited

FOREIGN PATENT DOCUMENTS

DE      102009058342 A1    6/2011
EP         1541003 A1      6/2005
(Continued)

OTHER PUBLICATIONS

Translation of International Search Report dated Nov. 9, 2015 in International Application No. PCT/EP2015/067601.
(Continued)

*Primary Examiner* — Christopher J. Novosad
(74) *Attorney, Agent, or Firm* — Erickson Kernell IP, LLC; Kent R. Erickson (57) ABSTRACT

A suspension device of an agricultural machine is intended for the mounting and elastic bearing of an implement, with a pivot arm carrying the implement, which pivot arm is elastically or pivotably mounted by means of at least one bearing section at a flange tube, which flange tube extends transversely to the work direction, with the bearing section surrounding the flange tube circumferentially and approximately coaxially, and with at least one elastic bearing element positioned between the bearing section and the section of the flange tube surrounded thereby, which elastic bearing element extends with its longitudinal axis essentially parallel to the pivoting axis of the pivot arm and to the longitudinal axis of the flange tube. Lateral support of the suspension device is provided by a guide element is on the suspension device having at least one guide surface for the lateral support and guidance of the implement.

18 Claims, 5 Drawing Sheets

(58) Field of Classification Search
CPC .. A01C 5/06; A01C 5/00; A01C 7/206; A01C 7/20; A01C 7/00; A01C 7/201
See application file for complete search history.

(56) References Cited

FOREIGN PATENT DOCUMENTS

| | | |
|---|---|---|
| EP | 1060649 B1 | 8/2005 |
| EP | 1880590 A1 | 1/2008 |
| EP | 2965602 B1 | 1/2016 |

OTHER PUBLICATIONS

Translation of Written Opinion dated Nov. 9, 2015 in International Application No. PCT/EP2015/067601.

SUSPENSION DEVICE OF AN AGRICULTURAL MACHINE

CROSS-REFERENCE TO RELATED APPLICATION

This application claims priority from German Application No. DE 10 2014 111 136.2 filed Aug. 5, 2014, the contents of which are incorporated herein by this reference.

BACKGROUND

The present invention relates to a suspension device of an agricultural machine with the features of the independent claim 1.

Such suspension devices or, as the case may be, agricultural machines with such suspension devices, are known from EP 1 060 649 B1 or from EP 1 880 590 A1, for example. In these devices known from the prior art, various tillage implements and sowing implements are attached to pivot arms such that the result is a suitable implement arrangement for the respectively intended use. The pivot arms are pivotably mounted on so-called flange tubes, and they have bearing sections, which surround the flange tube, with elastic bearing elements or squeeze bearing elements or rubber elements being arranged in each case between the mentioned bearing sections and the sections of the flange tube surrounded thereby.

The bearing sections of the pivot arms together with the flange tube accommodated therein as a rule have a square contour, and in their initial position they are rotated by approximately 45 degrees relative to each other, resulting in four triangle-shaped reception chambers for one bearing element each. Other combinations of flange tube and bearing section, such as for instance triangle-shaped contours, are, however, also possible and known.

One problem with such suspension devices frequently lies in stabilizing them and in the guidance between the bearing sections and the flange tube. An asymmetric arrangement of the tillage implements or the sowing implements at the pivot arm, such as for example, an inclined position of the coulter disks in relation to the driving direction or in relation to a perpendicular plane thereto, will cause transverse and lateral forces to build up, which partly become so great as to lead to substantial tilting moments, which in turn result in laterally tilting or twisting of the suspension devices or the pivot arms, as the case may be. By this tilting or by this inclined position, as the case may be, the pivot arm will moreover tend to shift transversely to the driving direction or along the flange tube parallelly thereto, as the case may be. Furthermore, the elastic bearing elements tend to become dislocated from the bearing sections.

EP 1 880 590 A1 already proposes a solution for solving the above-mentioned problems. For this purpose, the elastic bearing elements do not have the usual cylindrical design, but are rather designed to have a truncated cone form, at least partly and, in particular, at their end sections. This results in greater preload forces in the respective end sections of the bearing section, which is intended to lead not only to an improved lateral support, but also to prevent a dislocation of the bearing elements. A disadvantage of such a design, however, is that while the lateral support is improved, the possibility of twisting still remains. It is also possible that the force for the lateral support is insufficient due to the material quality of the bearing elements. This can be counteracted by increasing the material quality or the material hardness, leading, however, in turn to the risk that the preload forces become too great so that it can no longer be ensured that the suspension device can perform a sufficient pivoting motion in relation to the flange tube.

Disclosed in EP 1 541 003 A1 is moreover an overload protection, in particular for a soil working implement, with an elastic bearing, which consists of elastic bearing elements and two bearing shells, and, attached to the lower bearing shell, a shaft with a disk for tilling. In an unmounted state, the elastic bearing elements have an essentially round cross section with at least one longitudinally flattened portion. This flattened portion is intended to improve the elastic material characteristics of the bearing elements; the lateral support is likewise intended to be improved by such a design of the bearing elements.

DE 10 2009 058 342 A1 discloses a suspension device of an agricultural machine, which suspension device is particularly suited for tillage implements. The device comprises at least a pivot part carrying the machine part and a pivot part carrier, on which the pivot part is pivotably mounted. With a bearing section, the pivot part can surround the pivot part carrier in such a manner that bearing chambers are formed between the bearing section of the pivot part and the pivot part carrier. Elastic bearing elements can be associated with the bearing chambers, which bearing elements undergo an at least partial elastic deformation when the pivot part is pivoted. This known suspension, however, has the disadvantage that the forces of the lateral support depend on the material quality or on the Shore hardness of the bearing elements. This means that although a greater Shore hardness could improve the lateral support, this would, however, in this instance lead to decreasing the pivoting possibilities because greater preload forces also go along with a greater Shore hardness.

Also known are suspension devices, in which the flange tube and the inner surface of the bearing shells have the same cross section such that the inner surface of the bearing shell can pivot radially about the flange tube and is thus laterally supported. The suspension device in such a design, however, can also shift axially; and in addition, the dimensions of the flange tube and of the bearing shells must be adhered to very precisely, making this a very elaborate and costly approach.

SUMMARY

With regard to the known prior art, the object of the invention is to create a simply structured suspension device of an agricultural machine, the suspension device having elastic bearing elements, for which suspension device a sufficient lateral guidance or, as the case may be, support can be ensured even if great transverse and lateral forces prevail, for which a lateral shifting on a machine frame or, as the case may be, on a flange tube is prevented, and for which a dislocation of the bearing elements from the bearing sections is suppressed.

The objects of the invention are achieved by the subject matter of independent claim 1. Features of advantageous developments of the invention are specified in the dependent claims. In order to solve the stated object, the invention proposes a suspension device with at least one additional guide element assigned to it, which guide element is formed as a single part or in multiple parts and which has at least one guide surface and/or slide surface for the lateral support and/or guidance of the implement arrangement.

The invention relates to a suspension device of an agricultural machine, the suspension device being intended for the mounting and the elastic bearing of an implement arrangement for tilling and/or sowing, with at least one pivot arm carrying the implement arrangement, which pivot arm is elastically and/or pivotably mounted by means of at least one bearing section at a carrier tube or flange tube of the agricultural machine, which carrier tube or flange tube extends preferably transversely to the work direction. The bearing section surrounds the carrier tube or flange tube around its periphery and in an approximately coaxial alignment with the carrier tube or flange tube. At least one elastic bearing element is provided between the bearing section and the section of the carrier tube or flange tube surrounded thereby, which elastic bearing element extends with its longitudinal axis essentially parallel to the pivoting axis of the pivot arm and to the longitudinal axis of the carrier tube or flange tube, and which elastic bearing element undergoes an at least partial deformation by pivoting motions of the pivot arm. At least one additional guide element is associated with the suspension device, which guide element is formed in a single part or in multiple parts and has at least one guide surface and/or slide surface. If the guide element is formed in a single part, for example as a ring element, its inner contour or its guide surface, as the case may be, at least sectionally has a contour that is essentially the same as that of the flange surface of the flange tube and/or a cross section that is essentially the same as that of the flange surface of the flange tube. Optionally, the outer contour or, as the case may be, the guide surface of the guide element at least sectionally has a contour that is essentially the same as that of the bearing surface of the bearing sections and/or a cross section that is essentially the same as that of the of the bearing surface of the bearing sections. The inner contour and/or the outer contour thus in each case serve as guide surfaces or slide surfaces, respectively. The at least one guide element is thus designed in such a manner that it largely suppresses the axial shifting or twisting, as the case may be, which occurs due to the transverse or lateral forces, as the case may be, and forms a plain bearing, for example. The suspension device and/or the guide element can furthermore have attaching means associated with it by means of which an axial shifting is suppressed, and the guide element and the attaching means can in turn form a unit. A plain bearing preferably results by way of the contour and/or cross section of the flange surface being essentially the same as that of the flange tube, or by way of the contour and/or cross section of the guide surface being essentially the same as that of the bearing sections of the guide element. The transverse forces or, as the case may be, the tilting forces acting on the implement arrangement can be absorbed by the guide element or by the plain bearing, as the case may be. For this purpose, the guide element preferably has a greater hardness than the elastic rubber elements.

Furthermore, the guide element can be formed in multiple parts and be composed, for example, of an inner guide segment and an outer support segment. In this instance, the guide segment can have an inner contour, which at least sectionally has a contour and/or cross section that is essentially the same as that of the flange surface of the flange tube. The support segment can in turn have an outer contour, which at least sectionally has a contour and/or cross section that is essentially the same as that of the bearing surface of the bearing sections. In addition, the guide segment has an outer contour or a slide surface, as the case may be, and the support segment has an inner contour or a slide surface, as the case may be, which have largely the same contour and/or cross section, whereby a plain bearing results or whereby the guide segment and the support segment can slide upon one another, as the case may be.

The invention provides a flange tube that is part of a frame construction of an agricultural machine, for example, to which a multitude of suspension devices according to the invention with implement arrangements attached thereto can be mounted, which suspension devices are spaced apart from one another and, as the case may be, offset in relation to one another over several rows. The flange tube can have an essentially square contour and/or cross section, but at least sectionally cylindrical or triangular or such like contours or cross sections or any conceivable form would also be possible, as the case may be. It should be noted in this context that the carrier tube or flange tube can generally also be formed from a solid piece of material or as an open shape (e.g. a T-profile or the like). If the term "tube" is therefore used herein to generally refer to a closed hollow profile, this is by no means intended to be understood in a restrictive sense in the context of the present invention, but rather to the effect that the carrier tube or flange tube can also be formed from a solid piece of material or as an open shape.

The suspension device consists of an upper and a lower bearing section, for example, which each have a contour that is to the greatest possible extent the same as that of the flange tube. The upper and the lower bearing sections of the suspension device usually have a larger cross section than the flange tube. In addition, a pivot arm is attached to at least one of the bearing sections. According to the desired area of application, the various tillage implements and/or sowing implements are mounted thereto such that various different implement arrangements can result. The implement arrangements can be seed drill coulters, such as for instance single disk coulters or double disk coulters or coulter holders or tooth holders or the like.

In the basic position, the bearing sections or, as the case may be, the pivot arm, are arranged to be twisted, for example by an angle of approximately 45 degrees, in relation to the flange tube. Inserted into the free or, as the case may be, hollow spaces resulting thereby and extending parallel to the flange tube, are, according to the cross section of the bearing sections, two, three, or more elastic bearing elements, preferably in the form of so-called rubber cord elements. The pivot arm is pivotably movably connected radially to the flange tube by way of these bearing elements. This pivotable movability is influenced by various factors, for example, by the number of bearing elements present or by the material or the degree of hardness of the bearing elements, as the case may be. Furthermore, the bearing elements or, as the case may be, the guide elements thereto can in each case define the preload force of the pivot arm or of the implement arrangement, as the case may be. That is to say that the closer the bearing elements are pressed together, the greater is the preload force. In the instance of the guide elements, the preload force of the bearing elements can be increased or reduced, as the case may be, according to the ratio of the cross sections of inner guide surface to outer guide surface.

The invention further provides that at least one additional guide element is assigned to the suspension device. This guide element is designed, for example, such that it supports itself and/or such that it slides along with its inner guide surface upon the outer surface or, as the case may be, upon the flange surface of the flange tube, for which purpose both surfaces at least sectionally have contours and/or cross sections that are to the greatest possible extent the same. It can be additionally provided that this suspension device supports itself and/or that it slides along with its outer guide surface upon the inner surface or, as the case may be, upon the bearing surface of the bearing sections. The guide element is thus designed in such a manner it is capable of suppressing the axial shifting or, as the case may be, the twisting, which occurs due to the transverse or lateral forces, as the case may be, and that the implement arrangement can support itself by means of the guide element upon the flange tube and/or upon the bearing sections. For this purpose, the guide element is designed as plain bearing, for example, such that the implement carrier can slide along the guide element and/or along the flange tube and/or along the bearing sections.

It should already be noted here that the definition of a "contour and/or a cross section that is at least sectionally to the greatest possible extent the same" is to be understood to the effect that the contour or, as the case may be, the cross section of the guide element is designed such that the guide element can support itself or, as the case may be, slide upon the bearing sections or upon the flange tube. This would also already be the case, for example, in a combination of a round and a square cross section at the corners, for example, of the square cross section. In this instance, the wear for such a point bearing can be very high.

In order to counteract axial shifting of the suspension device along the pivot arm carrier, at least one attaching means can be associated with the suspension device and/or to the guide element. The attaching means can form a fixedly connected part together with the guide element. Alternatively, the attaching means could also be designed such that it is attached to the flange tube by means of screws or welding, for example. Any type of detachable and undetachable connections are possible and conceivable in this context. The attaching means could also be formed by a screw connection, which is present in or at the guide element, for example.

The guide element can be attached to the suspension device in various different places. It is conceivable to arrange a guide element centrally and the bearing elements both on the left side and on the right side next to it. The guide element could likewise be arranged on the left and/or on the right side at the edge sections of the suspension device. In a preferred embodiment, these guide elements are attached on the left and on the right side of the edge sections of the suspension device in order to thus achieve a large support distance and thereby strongly reduce the forces acting on the guide elements. This is particularly important with regard to selecting the material for the guide elements, as the surface pressure and thus the wear can be greatly minimized thereby. A further advantage in such an arrangement is that a lateral dislocation of the elastic bearing elements is prevented or suppressed, as the case may be.

A further development of the invention provides that the at least one guide element has at least one contour as a guide surface and/or slide surface, which contour is to the greatest possible extent circular. The circular contour is not intended to be understood in a restrictive sense; any other forms of embodiments are also conceivable. The guide element serves to suppress the axial shifting or, as the case may be, the twisting, which occurs due to the transverse or lateral forces, as the case may be. In addition, the bearing sections can support themselves by means of the guide element upon the flange tube.

In order to ensure easy mounting, the guide element can be formed in two parts or also in multiple parts. The guide element can moreover be composed of an inner guide segment and an outer support segment, where these can in turn also be formed in two parts or in multiple parts. If the flange surface of the flange tube has an angular form, for example, then the inner contour of the inner guide segment and of the outer guide segment can be correspondingly formed. The same applies to a cylindrical and to any other embodiment forms of the flange tube. Furthermore, the inner guide segment can have an inner contour, which at least sectionally has a contour and/or cross section that is to the greatest possible extent the same as that of the flange surface of the flange tube. In this context, the outer support segment has an outer contour, for example, which at least sectionally has a contour and/or cross section that is to the greatest possible extent the same as that of the inner bearing surface of the upper and lower bearing section. Both segments are moreover designed such that they in turn have a slide surface or a cross section, as the case may be, upon which they can mutually support themselves or upon which they can slide in relation to one another, as the case may be. That is to say, the inner guide segment has an outer contour that is to the greatest possible extent identical with the inner contour of the outer support segment. In order to ensure pivotability and/or sliding, these contours are preferably formed to be largely circular. The guide segment is connected to the flange tube in this instance, and the support segment to the bearing sections.

It can further be provided that at least one shoulder is associated with the guide element and/or to the inner guide segment and/or to the outer support segment. The shoulder serves for preventing, where applicable, an axial shifting of the guide element, which consists of two segments. It can thereby also be ensured that the two segments of the guide element are always in a correct position in relation to each other. The shoulder can in addition suppress an axial shifting of the suspension device on the flange tube.

The two segments or, as the case may be, the guide element and/or the flange tube or, as the case may be, the bearing sections, can moreover be made from different materials. The materials used can be metals and non-metal materials. Other materials, in particular such with good guiding characteristics, are also conceivable in this context. It is also conceivable that the materials have different degrees of hardness, thereby further increasing the guiding characteristics or the durability, as the case may be. The guide element and/or the bearing sections and/or the flange tube can be provided to be composed of a material combination, which requires no lubrication. Such material combinations could be preferentially used. Preferably, the material of the guide element has a greater degree of hardness than that of the elastic bearing elements, whereby the elastic characteristics of the bearing are optimized on the one hand, and the guidance is sufficiently stable on the other hand.

As already mentioned above, the support distance is greatly increased by an arrangement of two guide elements at the edge sections of the suspension device, whereby the forces or, as the case may be, the surface pressure acting on the guide elements can be reduced. This is likewise achieved by a large cross section of the flange tube or of the guide element or of the bearing sections, as the case may be, whereby the wear can also be strongly minimized, thus in turn making it possible to reduce the demands on the material combinations.

Furthermore conceivable is also a guide element that is formed to be ring-shaped, for instance, such that it only sectionally has a contour and/or cross section that is essentially the same as that of the flange surface of the flange tube and/or as that of the bearing surface of the bearing sections, for example, although, due to the small guide surfaces and/or slide surfaces such a design would be subject to considerable wear and durability could thus possibly not be ensured.

The bearing elements in the present invention are formed to be elastic. Preferably, the bearing elements take the form of so-called rubber cord elements, which are inserted such that the pivot arm is pivotably movably connected radially to the flange tube by way of these bearing elements. As already mentioned above, the bearing elements can in each case define the preload force of the pivot arm or of the implement arrangement, as the case may be; that is, the closer they are pressed together, the greater is the preload force. When using guide elements, these can define the preload force; that is, the preload force of the bearing elements can be increased or reduced, as the case may be, according to the ratio of the cross sections of inner guide surface to outer guide surface.

It should further be noted here that, beyond the previously described plain bearings, it is also possible to use rolling bearings or ball bearings or the like. In such an instance, these in turn have an inner contour, which at least sectionally has a contour and/or cross section that is essentially the same as that of the flange surface of the flange tube, and/or they have an outer contour, which at least sectionally has a contour and/or cross section that is essentially the same as that of the bearing surface of the bearing sections. Ball elements, for example, then serve as guide surface or slide surface, as the case may be.

BRIEF DESCRIPTION OF THE DRAWINGS

In the following passages, the attached figures further illustrate exemplary embodiments of the invention and its advantages. The size ratios of the individual elements in the figures do not necessarily reflect the real size ratios. It is to be understood that in some instances various aspects of the invention may be shown exaggerated or enlarged in relation to other elements to facilitate an understanding of the invention. The figures show as follows.

DETAILED DESCRIPTION

The same or equivalent elements of the invention are each designated by identical reference characters in the FIGS. 1A to 4D. Furthermore and for the sake of clarity, only the reference characters relevant for describing the respective figure are provided. It should be understood that the detailed description and specific examples of the device according to the invention, while indicating preferred embodiments, are intended for purposes of illustration only and are not intended to limit the scope of the invention.

Figure 1A:
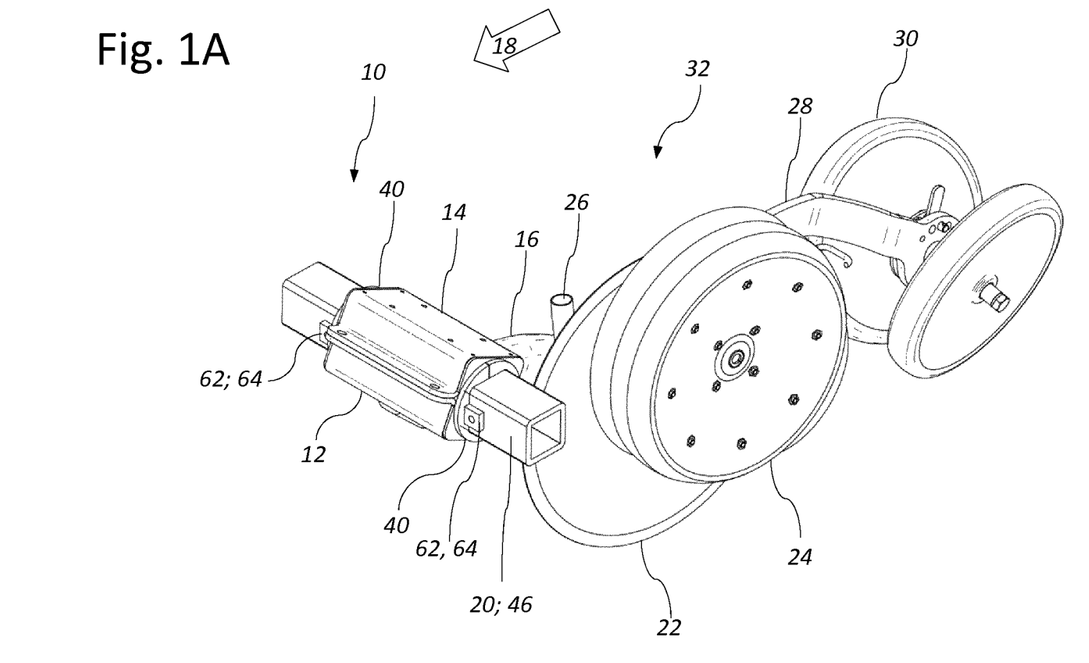
FIG. 1A: a schematic perspective view of a suspension device with bearing section and pivot arm, and arranged thereat tillage and sowing implements in the form of a so-called single disk coulter.
Figure 1B:
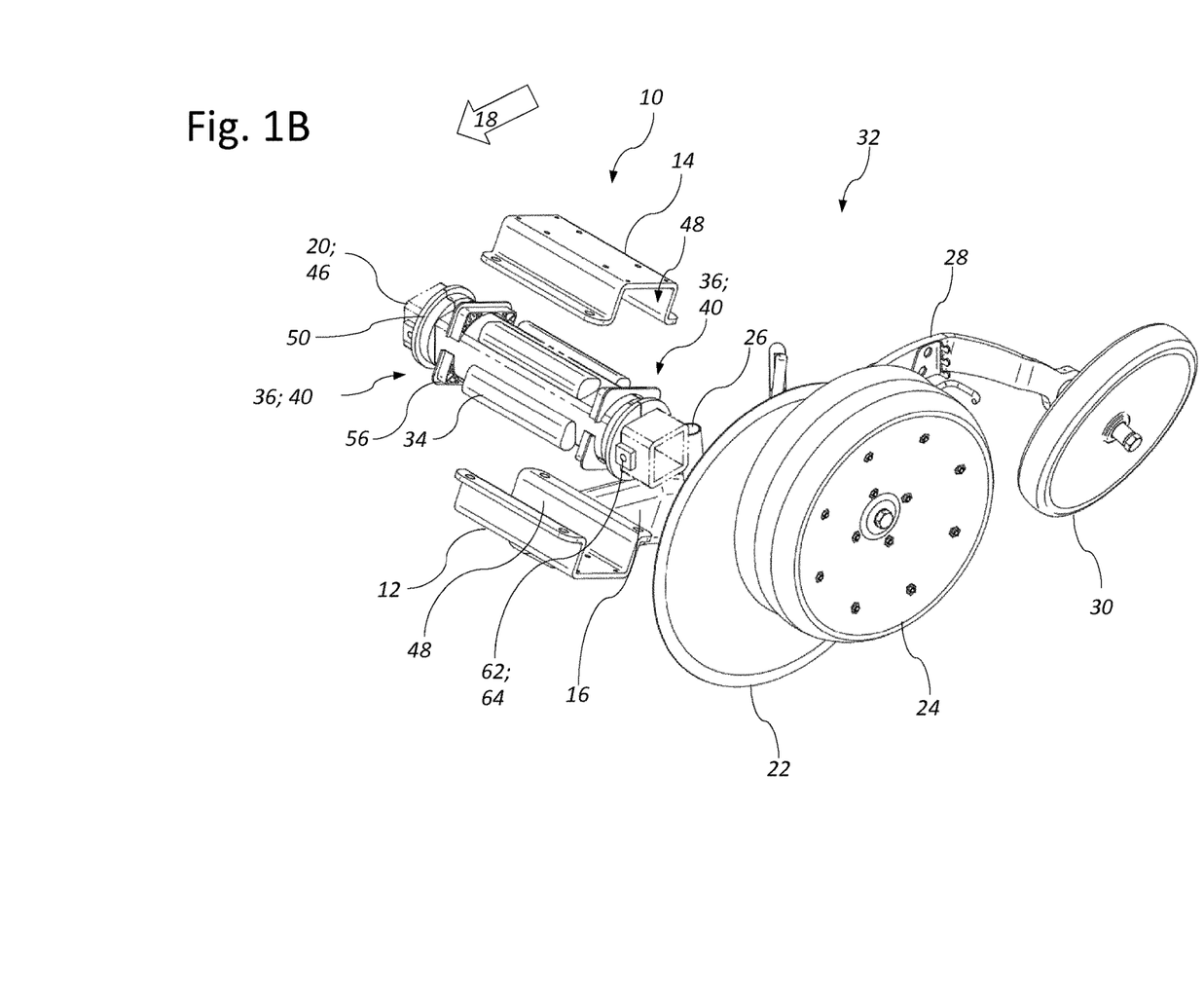
FIG. 1B: a schematic exploded view of a suspension device according to FIG. 1A.

FIGS. 1A and 1B show a schematic perspective view (FIG. 1A) and a schematic exploded view (FIG. 1B) of a suspension device 10 with a lower and an upper bearing section 12, 14, and also with a pivot arm 16, which is connected to the lower bearing section 12. The suspension device 10 is attached to a flange tube 20, which is aligned transversely to the driving direction 18. This flange tube 20 can be, for example, part of an agricultural machine, which is not illustrated here, to which a multitude of such suspension devices 10 can be mounted laterally offset in relation to each other.

Attached to the rear end of the pivot arm 16 by means of bearing elements not illustrated here are a cutting disk or, as the case may be, a coulter disk 22 and also a depth guidance wheel 24. The cutting disk 22 and the depth guidance wheel 24 are in this context arranged at an angle in relation to the driving direction 18 and in relation to a perpendicular plane thereto. A seed tube 26 extends laterally along the cutting disk 22. By means of this seed tube 26, the respective seeds or the like to be distributed can be supplied to the furrow cut by the cutting disk 22. Arranged downstream from the depth guidance wheel 24 by means of a swing arm 28 are further two pressure rollers 30 positioned at an angle to each other for the purpose of closing the groove or furrow, as the case may be, which was cut by the cutting disk 22. The thus resulting implement arrangement 32 is generally referred to as single disk coulter. It should also be noted here, however, that the suspension device according to the invention can also be used with other agricultural implement arrangements, for example, with so-called double disk coulters, with disk harrows and/or spike tooth harrows, or the like.

The flange tube 20 illustrated in the presented example has a square contour with rounded corners; cylindrical or triangular or other such contours are, however, also possible in this context. The upper and the lower bearing section 12, 14 both likewise have a square contour, and as with the flange tube 20, other contours are again also conceivable. The bearing sections 12, 14 are, however, slightly larger in cross section than the flange tube 20. The bearing sections 12, 14 or the pivot arm 16, as the case may be, are arranged at an angle rotated approximately 45 degrees in relation to the flange tube 20. Inserted into the thus resulting free spaces extending parallel to the flange tube 20 are four elastic bearing elements 34, preferably in the form of so-called rubber cord elements. The pivot arm 16 is connected radially to the flange tube 20 to be pivotably movable in relation thereto by way of these bearing elements 34. This pivotable movability is influenced by various factors, for example, by the number of bearing elements 34 present or by the material or the degree of hardness of the bearing elements 34, as the case may be, with the bearing elements 34 being deformed or, as the case may be, pressed together to a certain degree in a pivoting motion, as is in each case indicated in the FIGS. 1A to 4D. In addition, the bearing elements 34 or their elasticities and/or their dimensions, as the case may be, can each define the preload force of the pivot arm 16 or of the implement arrangement 32, as the case may be, that is, the closer they are pressed together, the greater is the preload force. When using additional guide elements 40, these can define the preload force; that is, the preload force of the bearing elements 34 can be increased or reduced, as the case may be, according to the ratio of the cross sections of inner guide surface 42 to outer guide surface 44.

Due to the inclined arrangement 32 of the implements at the pivot arm 16, relatively large transverse or, as the case may be, lateral forces occur in practice, which act upon the suspension and contribute to the tendency of the suspension device 10 to shift or twist, as the case may be, in an axial direction on the flange tube 20. This can particularly negatively affect implement arrangements 32 forming a seed drill coulter, as it is thus no longer possible to ensure a desired constant depth guidance and lateral guidance, if such is required.

In order to counteract this negative effect, at least one additional guide element 40 is associated with the suspension device 10, which guide element 40 is distinct from the elastic bearing elements 34 and formed in multiple parts in the present exemplary embodiment of the FIGS. 1 A to 3, and which is preferably arranged at the edge section 36 of the suspension device 10. This additional guide element 40 preferably surrounds the flange tube or carrier tube 20 and is preferably designed such that it supports itself at least sectionally with its inner contour 42 upon the outer surface 46 of the flange tube 20 and/or such that it supports itself at least sectionally with its outer contour 44 upon the bearing surface 48 of the bearing sections 12, 14. The inner contour 42 and/or the outer contour 44 thus each serve as guide surface or slide surface, as the case may be. The at least one guide element 40 is thus designed in such a manner that it largely suppresses the axial shifting or twisting, as the case may be, which occurs due to the transverse or lateral forces, as the case may be, and forms a plain bearing in the exemplary embodiment.

Figure 2:
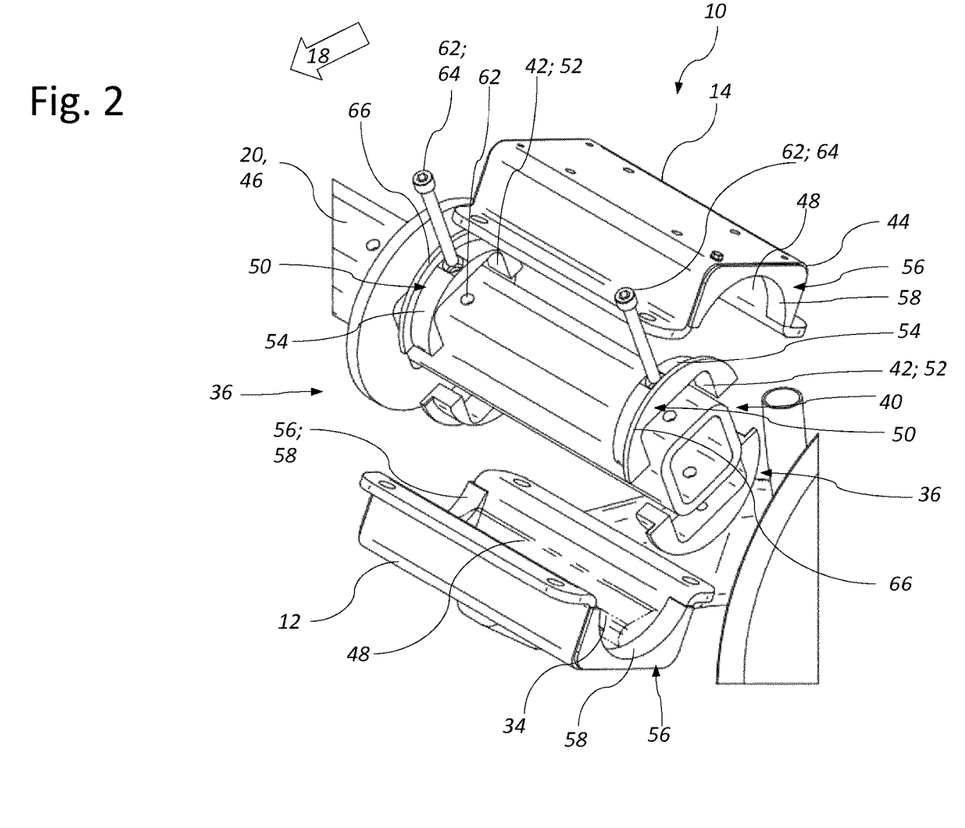
FIG. 2: a schematic detailed view of the suspension device with a further embodiment variant of the guide elements and of the attaching means.

As is discernible in particular from the FIGS. 1B and 2, the guide element 40 is formed from two segments, namely from an inner guide segment 50 and from an outer support segment 56, with these in turn being formed in two parts in order to thus enable an easier mounting. The guide element 40 is in this instance designed such that the guide segment 50 supports itself with its inner contour 52 upon the flange surface of the flange tube 20, and also such that the support segment supports itself with its outer contour 60 upon the bearing surface 48 of the upper and the lower bearing sections 12, 14. The guide segment and the support segment 50, 56 are, again, designed such that they have a slide surface 54, 58, respectively, so that they can mutually support themselves, and precisely in such a manner that the outer contour 54 of the guide segment 50 supports itself upon the inner contour 58 of the support segment.

The guide elements 40 or the guide segment and the support segment 50, 56, as the case may be, and the flange tube 20, and also the bearing sections 12, 14, are preferably made from different materials, such as, for example, from metals and from non-metal materials. In a preferred embodiment, the guide element 40 or the material combination, as the case may be, between the guide elements 40 and the flange tube 20 and/or the bearing sections 12, 14, is formed from such a material combination that no additional lubrication is required.

FIGS. 1A and 1B further show additional attaching means 62 associated with each of the guide elements 40. By means of these attaching means 62, it is possible to suppress the axial shifting of the suspension device 10 on the flange tube 20. For this purpose, the attaching means 62 can be, for example, immediately connected to the guide element 40 or be part of it, as the case may be (also see FIG. 2). It is likewise conceivable, however, that the attaching means 62 is connected to the flange tube 20, for example, by way of welding or by means of screws 64 (cf. FIG. 3).

In this context, FIG. 2 illustrates a further alternative embodiment in which the axial securing of the suspension device 10 is carried out by means of a screw 64, by means whereof the guide segment 50 is connected to the flange tube 20, and where the support segment 56 is likewise connected to the bearing section by means of a further screw 64. In order to avoid or prevent axial shifting, an outer shoulder or lateral support surface 66 is associated with the guide segment 50 in the exemplary embodiment of FIG. 2, which shoulder 66 suppresses axial shifting and serves for the guide segment 50 and the support segment 56 to each be precisely positioned in relation to each other.

In a sectional, schematic detailed view of the suspension device 10 according to the FIGS. 1A, 1B, and 2, FIG. 3 shows the mode of operation of the at least one additional guide element 40. In the beginning, one guide element 40 is associated with each of the lateral edge sections 36 of the suspension device 10. In this context, the guide element 40 is formed in two parts and consists of a guide segment 50 and a support segment 56. The inner contour 52 of the guide segment 50 here at least sectionally has a contour and/or cross section that is essentially the same as that of the outer surface 46 of the flange tube 20. Furthermore, the outer contour 60 of the support segment 56 has a contour and/or cross section that is essentially at least sectionally the same as that of the bearing surface 48 of the bearing sections 12, 14, whereby a lateral twisting of the suspension device 10 can be effectively prevented or suppressed, as the case may be. The support segment 56 and the guide segment 50 each in turn have an inner contour 58 or an outer contour 54, as the case may be, which serve as mutual slide surfaces for each other and which can also be formed such that the two parts can mutually support themselves; in addition this slide surface is in each case formed to be largely circular in order to enable pivoting or sliding, as the case may be.

Figure 3:
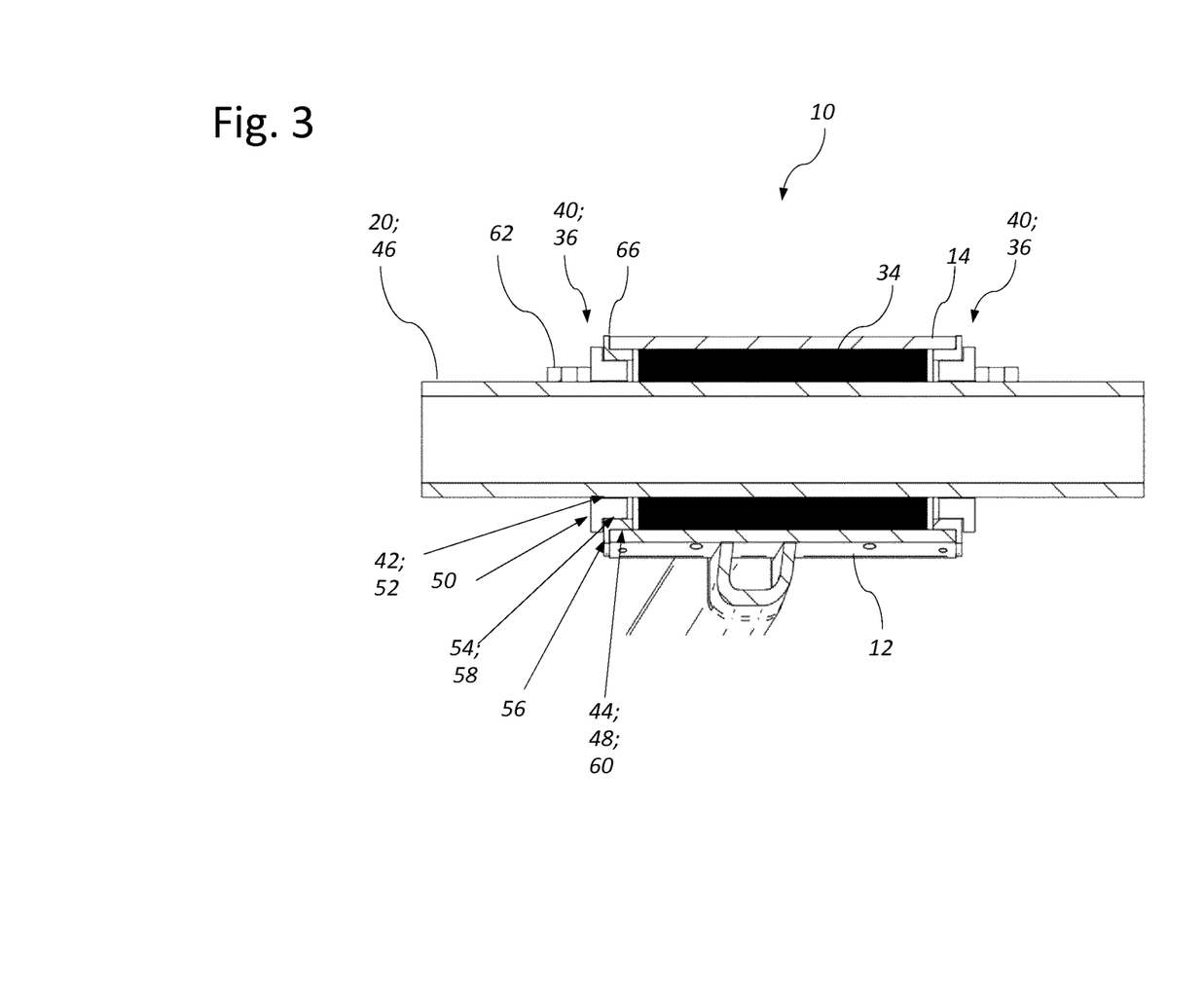
FIG. 3: a sectional, schematic detailed view of the suspension device according to the FIGS. 1A, 1B, and 2.

The arrangement shown according to FIG. 3 allows achieving a large support distance between the guide elements 40. By the large diameter of the guide elements 40, it is in addition achieved that relatively small surface pressures act on each of the guide elements 40, thus significantly reducing the wear and the maintenance effort. In addition hereto, it is also conceivable to select the material combinations for the guide elements 40 such that these also do not require any maintenance or, as the case may be, do not require any lubrication, or such that the wear is also minimized hereby, as the case may be.

FIG. 3 further shows that additional attaching means 62 are associated with each of the guide elements 40. By means of these attaching means 62, the axial shifting of the suspension device 10 on the flange tube can be suppressed. For this purpose, the attaching means 62 can be, for example, immediately connected to the guide element 40 or be part of the guide element 40, or form a unit with the guide element 40, as the case may be (also see FIG. 2). It is likewise conceivable, however, that the attaching means 62 is connected to the flange tube, for example, by way of welding or again by means of screws.

Figure 4A:
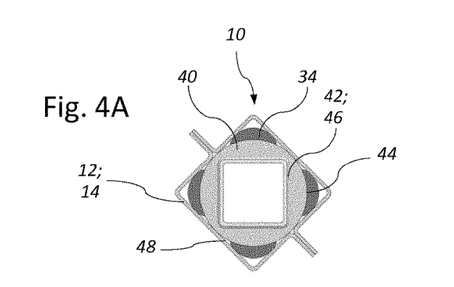
FIGS. 4A to 4D: various further alternative embodiments and arrangements of the guide elements.

Further exemplary embodiments of the suspension device 10 according to the invention follow from FIG. 4 (FIGS. 4A to 4D). First, FIG. 4A shows a further embodiment of a suspension device 10, in which the guide element 40 is formed as a single part and ring-shaped. The inner contour 42 of the guide element 40 again corresponds to the contour and/or cross section that is essentially at least sectionally the same as that of the flange surface 46 of the flange tube 20. The outer contour 44 of the guide element 40 essentially corresponds to the contour and/or cross section that is at least sectionally the same as that of the bearing surface 48 of the bearing sections 12, 14. In order to enable a movement of the bearing sections 12, 14 in relation to the pivot arm carrier, the outer contour 44 is formed as a slide surface and circular.

Figure 4B:
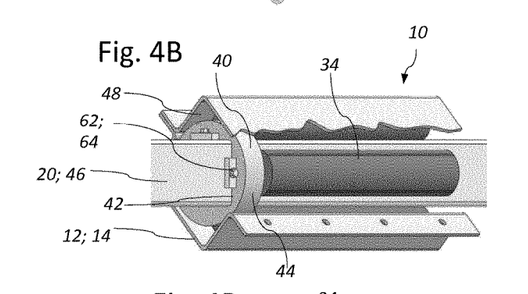
Figure 4C:
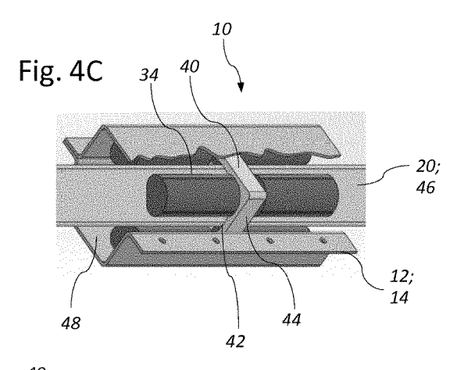
Figure 4D:
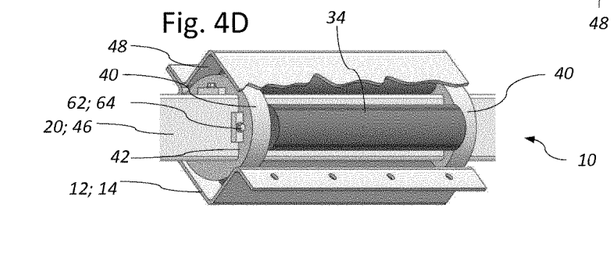

For the sake of completeness FIGS. 4B to 4D show further arrangement possibilities of the at least one guide element 40 in the suspension device 10 according to the invention and also further variants of the attaching elements 62 that also fall under the scope of protection of this invention. FIG. 4C further shows another design variant of the guide element 40, where this has an inner contour 42 as guide surface or slide surface, as the case may be, which has an essentially round cross section or, as the case may be, at least sectionally a contour and/or cross section that is essentially the same as that of the outer surface 46 of the flange tube; and where this further has an outer contour 44, which at least sectionally has a contour and/or cross section that is essentially the same as that of the bearing surface 48 of the bearing sections 12, 14.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Suspension device
12 Lower bearing section
14 Upper bearing section
16 Pivot arm
18 Driving direction
20 Flange tube
22 Cutting disk; coulter disk
24 Depth guidance wheel
26 Seed tube
28 Swing arm
30 Pressure roller
32 Implement arrangement
34 Bearing element
36 Edge section
40 Guide element
42 Inner contour/guide surface/slide surface
44 Outer contour/guide surface/slide surface
46 Flange surface
48 Bearing surface
50 Guide segment
52 Inner contour
54 Outer contour/slide surface
56 Support segment
58 Inner contour/slide surface
60 Outer contour
62 Attaching means
64 Screw
66 Shoulder

What is claimed is:

1. A suspension device of an agricultural machine, the suspension device for mounting and bearing of an implement arrangement relative to the agricultural machine, with at least one pivot arm carrying the implement arrangement, which at least one pivot arm is pivotably mounted by means of at least one bearing section at a carrier tube extending transversely to a work direction of the agricultural machine, wherein the at least one bearing section surrounds a section of the carrier tube circumferentially and approximately coaxially, wherein at least one elastic bearing element is provided between the at least one bearing section and the section of the carrier tube surrounded thereby, such that a longitudinal axis of the at least one elastic bearing element extends approximately parallel to a pivoting axis of the at least one pivot arm, and which at least one elastic bearing element undergoes an at least partial elastic deformation upon pivoting of the at least one pivot arm relative to the carrier tube, and wherein said suspension device further includes at least one guide element, distinct from the at least one elastic bearing element, said at least one guide element surrounding said carrier tube and extending between said carrier tube and said at least one bearing section and including a lateral support surface preventing axial shifting of the implement arrangement relative to the carrier tube.

2. The suspension device as recited in claim 1, in which the at least one guide element has a guide surface about which the implement arrangement can pivot radially.

3. The suspension device as recited claim 1, in which the at least one guide element includes inner and outer guide members in which the outer guide member rotates relative to the inner guide member and the lateral support surface is formed on one of the inner and outer guide members as a shoulder.

4. The suspension device as recited in claim 1, in which the at least one guide element and/or the at least one bearing section and/or the carrier tube are composed of a self-lubricating material.

5. The suspension device as recited in claim 1, in which the at least one guide element has a greater degree of hardness than the at least one elastic bearing element.

6. The suspension device as recited in claim 1, in which the at least one guide element is arranged centrally in the suspension device.

7. A suspension for pivotally mounting a tilling or sowing assembly to an agricultural implement, the suspension including a pivot arm carrying the tilling or sowing assembly and which is pivotably mounted relative to a support member by a pivot arm bearing assembly surrounding the support member wherein the pivot arm bearing assembly includes a housing surrounding the support member and to which the pivot arm is connected and at least one elastic bearing element extending between the housing and the support member, a longitudinal axis of the at least one elastic bearing element extending approximately parallel to a longitudinal axis of the support member, and wherein the at least one elastic bearing element undergoes an at least partial elastic deformation in response to rotation of the housing relative to the support member upon pivoting of the pivot arm, and wherein at least one radial bearing, distinct from the at least one elastic bearing element, surrounds the support member and extends between the support member and the housing and provides radial support between the housing and the support member.

8. The suspension as in claim 7 wherein the support member and the housing are approximately square in cross-section.

9. The suspension as in claim 7 wherein the at least one radial bearing comprises a cylindrical bearing secured to and projecting radially outward from the support member with the housing rotatable relative to and against the cylindrical bearing.

10. The suspension as in claim 7 wherein the at least one radial bearing comprises an inner cylindrical bearing secured to and projecting radially outward from the support member and an outer bearing section secured within the housing in alignment with the inner cylindrical bearing, an inner surface of the outer bearing section mating with an outer surface of the inner cylindrical bearing such that the outer bearing section and the housing rotate relative to the inner cylindrical bearing.

11. The suspension as in claim 7 wherein the at least on radial bearing comprises a bearing member secured within the housing and having an inner guide surface surrounding the support member and the at least one elastic bearing element and rotating relative thereto.

12. The suspension as in claim 7 wherein the at least one radial bearing comprises first and second radial bearings extending between the support member and the housing on opposite ends of at least one elastic bearing element.

13. The suspension as in claim 12 wherein the first and second radial bearings comprise first and second cylindrical bearings secured to and projecting radially outward from the support member with the housing rotatable relative to and against the first and second cylindrical bearings.

14. The suspension as in claim 12 wherein the first and second radial bearings comprise first and second inner cylindrical bearings secured to and projecting radially outward from the support member and first and second outer bearing sections secured within the housing in alignment with the first and second inner cylindrical bearings, inner surfaces of the first and second outer bearing sections mating with outer surfaces of the first and second inner cylindrical bearings such that the first and second outer bearing sections and the housing rotate relative to the first and second inner cylindrical bearings respectively.

15. A suspension for pivotally mounting a tilling or sowing assembly to an agricultural implement, the suspension including pivot arm carrying the tilling or sowing assembly and which is pivotably mounted relative to a support member by a pivot arm bearing assembly surrounding the support member wherein the pivot arm bearing assembly includes a housing surrounding the support member and to which the pivot arm is connected and at least one elastic bearing element extending between the housing and the support member, a longitudinal axis of the at least one elastic bearing element extending approximately parallel to a longitudinal axis of the support member, and wherein the at least one elastic bearing element undergoes an at least partial elastic deformation in response to rotation of the housing relative to the support member upon pivoting of the pivot arm, and wherein the pivot arm bearing assembly further comprises first and second radial bearings each surrounding the support member and extending between the support member and the housing on opposite ends of the at least one elastic bearing element; said first and second radial bearings providing radial support between the housing and the support member.

16. The suspension as in claim 15 wherein the first and second radial bearings comprise first and second cylindrical bearings secured to and projecting radially outward from the support member with the housing rotatable relative to and against the first and second cylindrical bearings.

17. The suspension as in claim 15 wherein the first and second radial bearings comprise first and second inner cylindrical bearings secured to and projecting radially outward from the support member and first and second outer bearing sections secured within the housing in alignment with the first and second inner cylindrical bearings, inner surfaces of the first and second outer bearing sections mating with outer surfaces of the first and second inner cylindrical bearings such that the first and second outer bearing sections and the housing rotate relative to the first and second inner cylindrical bearings respectively.

18. the suspension as in claim 15 wherein the first and second radial bearings each include a lateral support surface preventing axial shifting of the tilling or sowing assembly relative to the support member.

\* \* \* \* \*